United States Patent
Jiang (10) Patent No.: US 12,302,442 B2
(45) Date of Patent: May 13, 2025

(54) METHOD AND APPARATUS FOR CONTROLLING ACTIVE TIME, AND COMPUTER-READABLE STORAGE MEDIUM

(71) Applicant: XIAOMI COMMUNICATIONS CO., LTD., Beijing (CN)

(72) Inventor: Xiaowei Jiang, Beijing (CN)

(73) Assignee: XIAOMI COMMUNICATIONS CO., LTD., Beijing (CN)

(*) Notice: Subject to any disclaimer, the term of this patent is extended or adjusted under 35 U.S.C. 154(b) by 503 days.

(21) Appl. No.: 17/624,481

(22) PCT Filed: Jul. 5, 2019

(86) PCT No.: PCT/CN2019/094951
§ 371 (c)(1),
(2) Date: Jan. 3, 2022

(87) PCT Pub. No.: WO2021/003625
PCT Pub. Date: Jan. 14, 2021

(65) Prior Publication Data
US 2022/0361282 A1  Nov. 10, 2022

(51) Int. Cl.
*H04W 76/28* (2018.01)

(52) U.S. Cl.
CPC ............ *H04W 76/28* (2018.02)

(58) Field of Classification Search
CPC . H04W 76/28; H04W 72/1215; H04W 72/12; H04W 72/23; Y02D 30/70
See application file for complete search history.

(56) References Cited

U.S. PATENT DOCUMENTS

| | | | |
|---|---|---|---|
| 2012/0082140 A1* | 4/2012 | Lin | H04W 72/1215 370/336 |
| 2015/0319643 A1* | 11/2015 | Zhu | H04W 72/0446 370/336 |
| 2017/0215222 A1* | 7/2017 | Cheng | H04W 76/28 |
| 2018/0368164 A1* | 12/2018 | Lunden | H04W 76/28 |
| 2019/0335528 A1* | 10/2019 | Bin Sediq | H04W 76/28 |
| 2020/0351818 A1* | 11/2020 | Park | H04W 52/0216 |

FOREIGN PATENT DOCUMENTS

| | | |
|---|---|---|
| CN | 103430593 A | 12/2013 |
| CN | 108093495 A | 5/2018 |

OTHER PUBLICATIONS

PCT/CN2019/094951 English translation of International Search Report dated Mar. 25, 2020, 2 pages.

* cited by examiner

*Primary Examiner* — John D Blanton
(74) *Attorney, Agent, or Firm* — Cozen O'Connor (57) ABSTRACT

A method for controlling an active time. The method includes: receiving an indication signal sent by an access network device within a DRX active time; and determining, based on IDC related information of the terminal, whether to extend the DRX active time after receiving the indication signal.

20 Claims, 6 Drawing Sheets

METHOD AND APPARATUS FOR CONTROLLING ACTIVE TIME, AND COMPUTER-READABLE STORAGE MEDIUM

CROSS-REFERENCE TO RELATED APPLICATION

This application is a U.S. national phase of International Application No. PCT/CN2019/094951, filed with the State Intellectual Property Office of P. R. China on Jul. 5, 2019, the entire content of which is incorporated herein by reference for all purposes.

TECHNICAL FIELD

The disclosure relates to a field of communication technologies, and particularly to a method and an apparatus for controlling an active time and a non-transitory computer-readable storage medium.

BACKGROUND

At present, most terminals have various communication modules, including a communication module based on the new ratio (NR) technology and a communication module based on the non-NR technology, such as a wireless fidelity (WI-FI) module, a Bluetooth module, a global navigation satellite system (GNSS) module and so on. These communication modules based on the non-NR technology usually adopt industrial scientific medical (ISM) frequency bands, which partially overlap with the frequency bands adopted by the NR technology. Thus, mutual interference may occur when the communication module based on the NR technology and the communication module based on the Non-NR technology transmit signals, which may affect signal quality. This situation may be referred to as in device coexistence (IDC), and the terminal needs to solve this problem using an IDC solution.

SUMMARY

The disclosure provides a method and an apparatus for controlling an active time and a non-transitory computer-readable storage medium.

According to a first aspect of the embodiments of the disclosure, a method for controlling an active time is provided. The method includes: receiving an indication signal sent by an access network device within a discontinuous reception (DRX) active time; and determining, based on in-device coexistence (IDC) related information of the terminal, whether to extend the DRX active time after receiving the indication signal.

According to a second aspect of the embodiments of the disclosure, an apparatus for controlling an active time is provided, and includes: a processor; and a memory configured to store instructions executable by the processor; the processor is configured to load and execute the instructions to implement the method for controlling an active time according to the first aspect.

According to a third aspect of the embodiments of the disclosure, a non-transitory computer-readable storage medium is provided. When instructions stored in the computer-readable storage medium are executed by a processor, the method for controlling an active time according to the first aspect is implemented.

It should be understood that, the above general descriptions and latter detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The various embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

In order to better understand embodiments of the present disclosure, terms in the present disclosure will be explained as follows.

In device coexistence (IDC): one device may have both a communication module based on the new ratio (NR) technology and a communication module based on the non-NR technology, for example a wireless fidelity (WI-FI) module, a Bluetooth module, a global navigation satellite system (GNSS) module and so on. These communication modules based on the non-NR technology usually adopt industrial scientific medical (ISM) frequency bands, which partially overlap with the frequency bands adopted by the NR technology. Thus, mutual interference may occur when the communication module based on the NR technology and the communication module based on the Non-NR technology transmit signals, which may affect signal quality. This situation where the mutual interference occurs when the communication module based on the NR technology and the communication module based on the Non-NR technology in the same device transmit signals may be referred to as IDC.

Figure 1:
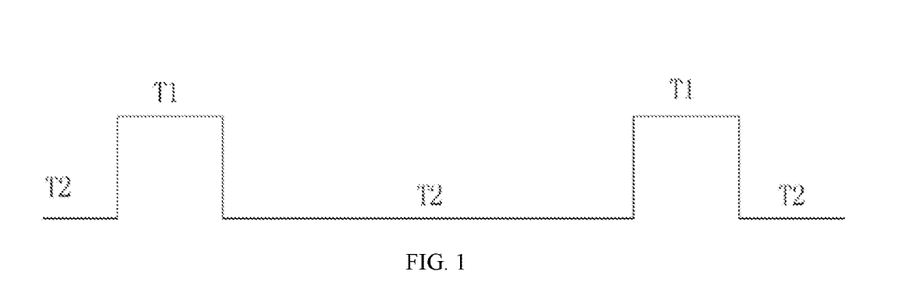
FIG. 1 is a schematic diagram illustrating a DRX cycle according to an embodiment.

DRX cycle: in a DRX mechanism, a network device configures the DRX cycle for a terminal in a radio resource control (RRC) connected state. As illustrated in FIG. 1, the DRX cycle is consisted of a part T1 (On Duration) and a part T2 (Opportunity for DRX). During the ON Duration, the terminal monitors and receives PDCCH, while during the Opportunity for DRX, the terminal may not monitor the PDCCH to reduce power consumption.

Wake Up Signal (WUS): it is a detection signal with a low power consumption. When the terminal receives the WUS, the terminal monitors the PDCCH when the time of the On Duration arrives. If the terminal does not receive the WUS, the terminal skips the On Duration and keeps a sleep state.

On Duration Timer: it refers to the time duration during which the terminal monitors PDCCH sub-frames within one DRX cycle. In the time duration (i.e., the part T1), the terminal is in an awaken state.

Inactivity Timer, it refers to the number of PDCCH sub-frames to be continuously monitored after the terminal successfully decodes one PDCCH sub-frame indicating a new uplink or downlink transmission.

DRX Retransmission Timer: it refers to the maximum number of PDCCH sub-frames that should be continuously monitored if the terminal expects to receive a downlink retransmission.

ra-Contention Resolution Timer: it refers to the number of PDCCH sub-frames to be monitored after a msg3 message is sent during a random access procedure, so to wait for a contention resolution message from the access network device.

DRX active time: the terminal monitors PDCCH sub-frames in the DRX active time. DRX active time includes a running time of the On Duration Timer, a running time of the Inactivity Timer, a running time of the DRX Retransmission Timer, and a running time of the ra-Contention Resolution Timer.

DRX off time: it refers to time other than the DRX active time. During the DRX off time, the terminal does not monitor the PDCCH sub-frames.

Solving the IDC problem based on DRX (also referred to as DRX solution): during the DRX active time, date transmission is performed based on the NR technology, i.e., the PDCCH sub-frames are monitored. During the DRX off time, the data transmission is performed based on the non-NR technology.

In a new radio (NR) system, a device is allowed to use unlicensed spectrum to transmit signals.

The unlicensed spectrum is a spectrum configured for communication between radio devices that is determined based on country and region, which is generally considered as a shared spectrum, that is, the communication devices in different communication systems may use the spectrum as long as the communication devices meet a regulatory requirement on the spectrum specified in the country or region, without applying for a proprietary licensed spectrum to the government. The unlicensed spectrum may also be referred to by those skilled in the art as an license-free spectrum, a shared spectrum, an unlicensed frequency band, a license-free frequency band, a shared frequency band, a grant-free spectrum, a grant-free frequency band, or some other appropriate terms.

Various communication modules in the terminal, for example, the WI-FI module, the Bluetooth module, the GNSS module may adopt the unlicensed spectrum for communication. Before signal transmission with the unlicensed spectrum, the device needs to follow a listen-before-talk (LBT) principle, that is, the device needs to perform a clear channel assessment (CCA) to determine whether the channel of the unlicensed spectrum is occupied, and send a signal through the channel of the unlicensed spectrum when determining that the channel is not occupied (i.e., idle).

An access network device also needs to perform the LBT, and starts to schedule the terminal when determining that the channel of the unlicensed spectrum is obtained. Thus, for the terminal, the former part of the On Duration within one DRX cycle may be wasted because the access network device has not obtained the channel, such that the terminal can be scheduled in a short time, i.e., the access network device can only use a short scheduling time. In order to ensure that the access network device has enough time to schedule the terminal, the DRX active time of the terminal needs to be extended. However, for the terminal using the IDC solution based on DRX (i.e., the terminal solving the IDC problem based on DRX), if the DRX active time is extended, the DRX off time is shorten correspondingly, which may have a bad effect on the data transmission based on the non-NR technology.

One IDC solution is the IDC solution based on discontinuous reception (DRX). In the IDC resolution based on DRX, the terminal in an active state may continuously monitor a physical downlink control channel (PDCCH), until a timer corresponding to the active state expires. The terminal in an inactive state does not monitor the PDCCH and transmits data using the non-NR technology. This IDC resolution solves the IDC problem substantially based on time division multiplexing.

Figure 2:
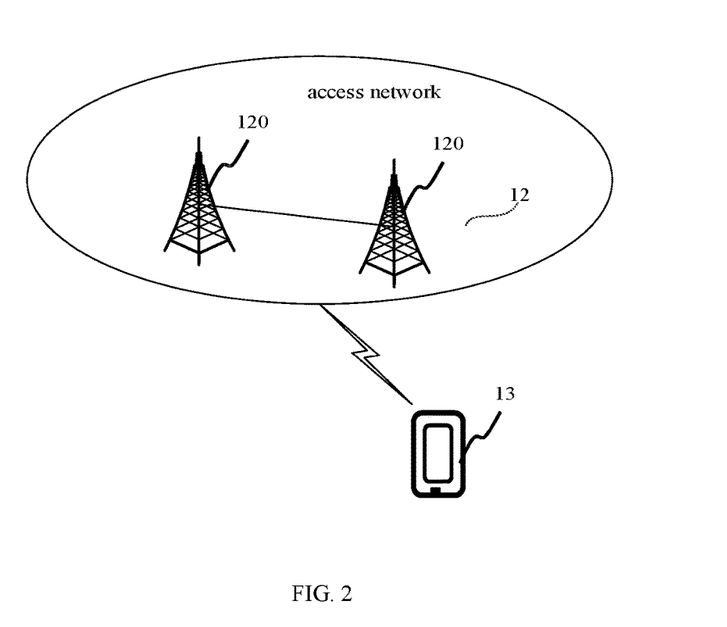
FIG. 2 is a schematic diagram illustrating a communication system according to an embodiment.

FIG. 2 illustrates a schematic diagram of an architecture of a communication system according to an embodiment of the disclosure. As illustrated in FIG. 2, the communication system may include an access network 12 and a terminal 13.

The access network 12 includes several access network devices 120. The access network device may be a base station (BS). The base station is a device deployed in the access network to provide a wireless communication function for the terminal. The base station may include a macro base station, a micro base station, a relay station, an access point, etc. In systems adopting different wireless access technologies, designations of the devices have the function as the base station may be different. For example, in an LTE system, it may be called as an evolved NodeB (eNB or eNodeB). In a 5G NR system, it may be called as gNodeB or gNB. With evolution of the communication technologies, the designation "base station" may change. For convenience of description, the above apparatus that provides the wireless communication function for the terminal is collectively referred to as an access network device in the following.

The terminal 13 may include a handheld device, a vehicle-mounted device, a wearable device, a computing device that has the wireless communication function or other devices connected to a wireless Modem, and a user equipment (UE), a mobile station (MS), a terminal device and so on. For convenience of description, the above apparatus is collectively referred to as a terminal. The access network device 120 and the terminal communicate with each other via a certain NR technology, for example via the Uu interface.

The terminal 13 is configured with a DRX cycle. Within one DRX cycle, the terminal monitors and receives the PDCCH during the On Duration, and does not monitor the PDCCH during the Opportunity for DRX to reduce power consumption.

The communication system and business scenario described in embodiments of the present disclosure are intended to explain the technical solution of embodiments of the present disclosure more clearly, and does not constitute a limitation of the technical solution provided by embodiments of the present disclosure. Those skilled in the art know that, with evolution of the communication system and emergence of new business scenarios, the technical solution provided in the embodiments of the present disclosure are equally applied to similar technical problems.

Figure 3:
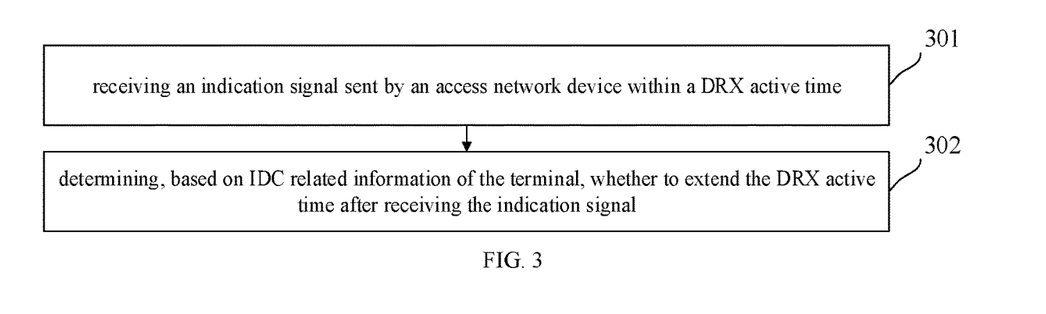
FIG. 3 is a flowchart illustrating a method for controlling an active time according to an embodiment.

FIG. 3 is a flowchart illustrating a method for controlling an active time according to an embodiment of the disclosure. The method can be executed by the terminal 13 shown in FIG. 2. As illustrated in FIG. 3, the method includes the following.

At block S301, an indication signal sent by an access network device is received within a DRX active time.

At block S302, after the indication signal is received, it is determined whether to extend the DRX active time based on IDC related information of the terminal.

The terminal may know that the access network device obtains the channel of the unlicensed spectrum after receiving the indication signal.

Here, "extending the DRX active time" may be also referred to as prolonging the DRX active time.

Alternatively, the IDC related information includes at least one of information on whether the terminal has an IDC problem, information on whether the terminal solves the IDC problem based on DRX, and network configuration information; in which the network configuration information is configured to indicate whether extending the DRX active time is allowed, and the network configuration information is generated by the access network device based on the information on whether the terminal has the IDC problem.

In one embodiment, if IDC occurs in the terminal, it indicates that the terminal has the IDC problem. If no IDC occurs in the terminal, it indicates that the terminal does not have the IDC problem. Here, the IDC problem may refer to an IDC problem that the terminal cannot solve by itself. The terminal solving the IDC problem based on DRX refers to that the DRX active time is configured to transmit data based on the NR technology, and the DRX off time is configured to transmit data based on the non-NR technology.

In one embodiment, the IDC related information may directly or indirectly reflect whether the terminal may solve the IDC problem based on DRX. For example, in the case that the IDC related information includes information on whether the terminal has the IDC problem, if the terminal has the IDC problem, it indicates that the terminal may solve the IDC problem based on DRX; if the terminal does not have the IDC problem, it indicates that the terminal does not solve the IDC problem based on DRX. Thus, the IDC related information may indirectly reflect whether the terminal may solve the IDC problem based on DRX. For example, in the case that the IDC related information includes information on whether the terminal solves the IDC problem based on DRX, the IDC related information directly reflects whether the terminal solves the IDC problem based on DRX. For another example, in the case that the IDC related information includes the network configuration information generated by the access network device based on information on whether the terminal has the IDC problem, it is similar to the case that the IDC related information includes the information on whether the terminal has the IDC problem, the IDC related information may indirectly reflect whether the terminal may solve the IDC problem based on DRX.

In one embodiment, by controlling the active time (i.e., a duration of an active state) of the terminal based on the IDC related information of the terminal, the access network device may obtain more scheduling time, and it has a less effect on the communication based on the non-NR technology.

Alternatively, determining whether to extend the DRX active time based on the IDC related information may include extending the DRX active time in response to the IDC related information meeting a predetermined condition, and not extending the DRX active time in response to the IDC related information not meeting the predetermined condition.

Alternatively, determining based on the IDC related information whether to extend the DRX active time may include extending the DRX active time in response to the terminal having no IDC problem.

Alternatively, determining based on the IDC related information whether to extend the DRX active time may include extending the DRX active time in response to the terminal having the IDC problem and the terminal not solving the IDC problem based on the DRX.

Alternatively, determining based on the IDC related information whether to extend the DRX active time may include extending the DRX active time in response to the network configuration information indicating that extending the DRX active time is allowed.

Alternatively, extending the DRX active time includes restarting a running DRX timer or delaying an expiring time of the running DRX timer, in which the running DRX timer is any one of an on duration timer, an inactivity timer, a DRX retransmission timer and a random access contention resolution timer.

Alternatively, extending the DRX active time includes monitoring a physical downlink control channel (PDCCH) within a predetermined duration after receiving the indication signal; or starting another timer when receiving the indication signal, in which the another timer is a timer other than a running DRX timer, and when both the another timer and the running DRX timer expire, the DRX active timer ends.

The predetermined duration and a duration of the another timer is greater than a remaining duration of the running DRX timer.

Since the predetermined duration is longer than the remaining duration of the running DRX timer, after the running DRX timer expires, the PDCCH is monitored continually, i.e., the DRX active time is extended. Since the duration of the another timer is longer than the remaining duration of the running DRX timer (i.e., the expiring time of the another timer is later than the expiring time of the DRX timer), when both timers run, the another timer expires after the DRX timer expires, such that the DRX active time is extended.

Alternatively, the network configuration information is further configured to indicate an extended duration of the DRX active time; extending the DRX active time includes extending the DRX active time based on the extended duration.

Alternatively, the method further includes receiving the network configuration information sent by the access network device.

It should be noted that, the foregoing steps 301-302 may be combined with any alternative steps described above.

Figure 4:
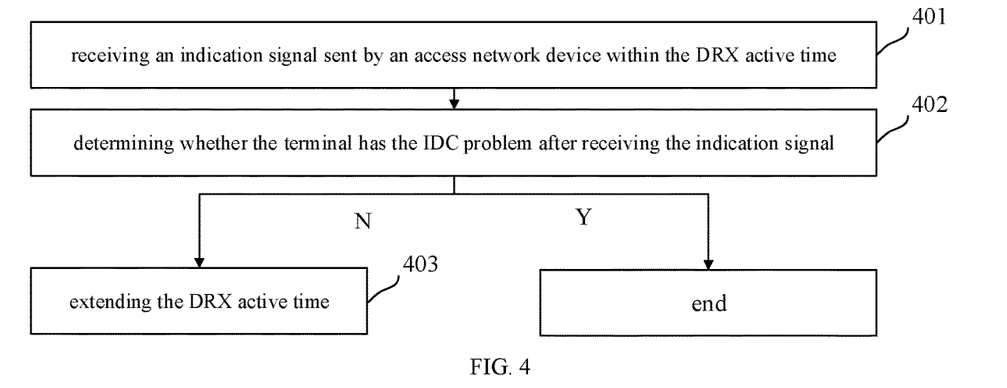
FIG. 4 is a flowchart illustrating a method for controlling an active time according to an embodiment.

FIG. 4 is a flowchart illustrating a method for controlling an active time according to an embodiment of the disclosure. In the method shown in FIG. 4, the IDC related information includes information on whether a terminal has an IDC problem. That is, the DRX active time is extended based on the information on whether the terminal has the IDC problem. The method can be executed by the terminal. As illustrated in FIG. 4, the method includes the following.

At block 401, an indication signal sent by an access network device is received within the DRX active time.

Correspondingly, before block 401, the access network device needs to send the indication signal. Since the access network device needs to follow the LBT principle on the unlicensed spectrum before transmitting data, the access network device needs to perform channel monitoring, if the current channel is idle, it indicates that the access network device may use the channel to send signals, i.e., the access network device obtains the channel; if the channel is busy, the access network device needs to back off for a while and perform channel monitoring continually, until it monitors that the channel is idle.

Alternatively, the indication signal may be a discovery reference signal (DRS), a demodulation reference signal (DMRS) in PDCCH, a channel state information-reference signal (CSI-RS), a synchronization signal block (SSB) or a WUS. These signals are sent early by the access network device after the channel is obtained, such that these signals may be used to inform the terminal that the access network device has obtained the channel as early as possible. There is a high possibility that terminal receiving any of these signals is scheduled.

At block 402, after the indication signal is received, it is determined whether the terminal has the IDC problem.

After the indication signal is received, the terminal may know that the access network device obtains the channel of the unlicensed spectrum, and start to determine whether the terminal has the IDC problem.

If the terminal does not have the IDC problem, the step at block 403 is executed. If the terminal has the IDC problem, the current procedure ends, that is, if the terminal has the IDC problem, the DRX active time is not extended, and the terminal enters the DRX off time and does not monitor the PDCCH after the original DRX active time ends.

In block 402, the terminal may determine whether the terminal has the IDC problem in the following ways.

Based on a frequency used by a transmitting signal of a first communication technology and a bandwidth range of a second communication technology, it is determined whether the terminal has the IDC problem. For example, if the frequency of the transmitting signal of the first communication technology falls in the bandwidth range of the second communication technology, it is determined that the terminal has the IDC problem. If the frequency of the transmitting signal of the first communication technology does not fall in the bandwidth range of the second communication technology, it is determined that the terminal does not have the IDC problem. One of the first communication technology and the second communication technology is the NR technology, and the other is the non-NR technology.

It should be noted that, other methods in the related art can be used to determine whether the terminal has the IDC problem, which is not limited herein.

In a possible implementation, the terminal may determine whether it has the IDC problem in advance, generates information indicating whether the terminal has the IDC problem and stores the information locally. In this case, the step at block 402 may include checking the information indicating whether the terminal has the IDC problem stored locally after receiving the indication signal.

In another possible implementation, the terminal may use the above mentioned way to determine whether the terminal has the IDC problem, i.e., determining the IDC related information, after receiving the indication signal.

At block 403, the DRX active time is extended.

In a possible implementation, the step at block 403 may include restarting a running DRX timer or delaying an expiring time of the running DRX timer, in which the running DRX timer is any one of an on duration timer, an inactivity timer, a DRX retransmission timer and a random access contention resolution timer (also called as ra-contention resolution timer).

In this implementation, there may be following situations.

If the on duration timer is running, the on duration timer is restarted or the expiring time of the on duration timer is delayed.

Or, if the inactivity timer is running, the inactivity timer is restarted or the expiring time of the inactivity timer is delayed.

Or, if the DRX retransmission timer is running, the DRX retransmission timer is restarted or the expiring time of the DRX retransmission timer is delayed.

Or, if the ra-contention resolution timer is running, the ra-contention resolution timer is restarted or the expiring time of the ra-contention resolution timer is delayed.

The DRX active time is extended by restarting the running DRX timer or delaying the expiring time of the running DRX timer, it merely needs to slightly adjust the control logic of the original timer, which is easy to implement.

Correspondingly, after restarting the running DRX timer or delaying the expiring time of the running DRX timer, the method may further include setting the terminal to be an inactive state after the running DRX timer expires. For the terminal solving the IDC problem based on DRX, the method may further include performing communication based on a non-NR technology during the DRX off time.

In another possible implementation, the step at block 403 may include monitoring a physical downlink control channel (PDCCH) within a predetermined duration after receiving the indication signal; or starting another timer when receiving the indication signal, in which the another timer is a timer other than a running DRX timer, and when both the another timer and the running DRX timer expire, the DRX active timer ends.

The predetermined duration and a duration of the another timer can be set according actual requirements, for example, the channel occupancy time (COT).

The DRX active time is extended by setting the duration for monitoring the PDCCH separately or additionally setting a timer, it is easy to implement.

Correspondingly, the method may further include setting the terminal to be the inactive state when the predetermined duration after receiving the indication signal elapses or when both the another timer and the running DRX timer expire. For the terminal solving the IDC problem based on DRX, the method may further include performing communication based on a non-NR technology during the DRX off time.

Determining whether to extend the DRX active time based on the IDC related information can be implemented through steps at blocks 402-403.

In the embodiment, for the terminal not having the IDC problem, extending the DRX active time may enable the access network device to have more sufficient time to schedule the terminal. Since the terminal has no IDC problem, the terminal does not solve the IDC problem based on DRX, extending the DRX active time has no effect on the communication based on the non-NR technology. For the terminal having the IDC problem, the DRX active time is not extended. In this way, in the terminal having the IDC problem, the DRX off time of the terminal solving the IDC problem based on DRX is not occupied, such that normal communication of the communication module based on the non-NR technology in the terminal is ensured.

Figure 5:
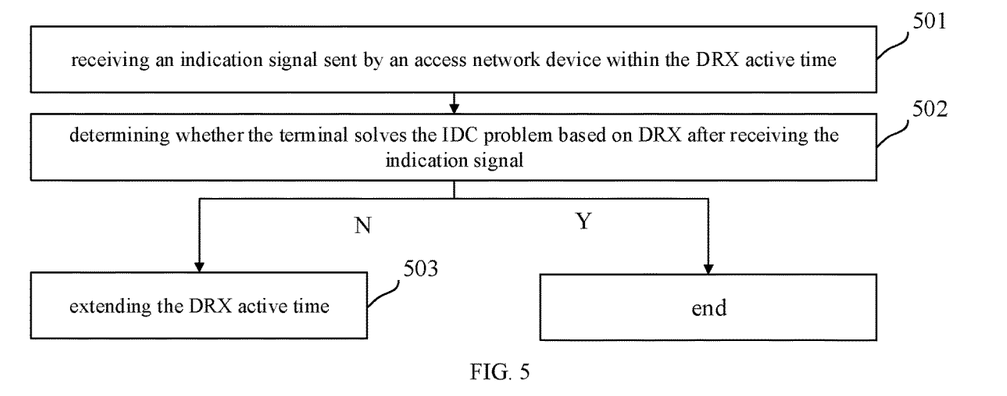
FIG. 5 is a flowchart illustrating a method for controlling an active time according to an embodiment.

FIG. 5 is a flowchart illustrating a method for controlling an active time according to an embodiment of the disclosure. In the method shown in FIG. 5, the IDC related information includes information on whether a terminal solves an IDC problem based on DRX. That is, the DRX active time is extended based on the information on whether the terminal solves the IDC problem based on DRX. The method can be executed by the terminal. As illustrated in FIG. 5, the method includes the following.

At block 501, an indication signal sent by an access network device is received within the DRX active time.

Regarding to description of the step at block 501, reference can be made to the step at block 401, which is not elaborated here.

At block 502, after the indication signal is received, it is determined whether the terminal solves the IDC problem based on DRX. If the terminal does not solve the IDC problem based on DRX, the step at block 503 is executed. If the terminal solves the IDC problem based on DRX, the current procedure ends.

In block 502, information on whether the terminal solves the IDC problem based on DRX can be determined by the network device based on reference information fed back by the terminal, and indicated to the terminal through a configuration message. The reference information includes but is not limited to time division multiplexing (TDM) assistance information, for example, the NR technology is based on frequency division duplexing or time division duplexing. Regarding the specific implementation, reference can be made to the related art, which is not elaborated herein. The terminal can store corresponding identification information locally after receiving the configuration message indicating whether to solve the IDC problem based on DRX, and subsequently determine based on the locally stored identification information whether the terminal solves the IDC problem based on DRX after receiving the indication signal in block 501.

In other words, the step at block 502 may include checking the locally stored identification information configured to indicate whether the terminal solves the IDC problem based on DRX after receiving the indication signal.

At block 503, the DRX active time is extended.

Regarding to description of the step at block 503, reference can be made to the step at block 403, which is not elaborated here.

Determining whether to extend the DRX active time based on the IDC related information can be implemented through steps at blocks 502-503.

In the embodiment, for the terminal not solving the IDC problem based on DRX, extending the DRX active time may enable the access network device to have more sufficient time to schedule the terminal. For the terminal not solving the IDC problem based on DRX, shortening the DRX off time has no effect on the communication of the communication module based on the non-NR technology. For the terminal solving the IDC problem based on DRX, the DRX active time is not extended. In this way, in the terminal solving the IDC problem based on DRX, the DRX off time is not occupied, such that normal communication of the communication module based on the non-NR technology in the terminal is ensured.

Figure 6:
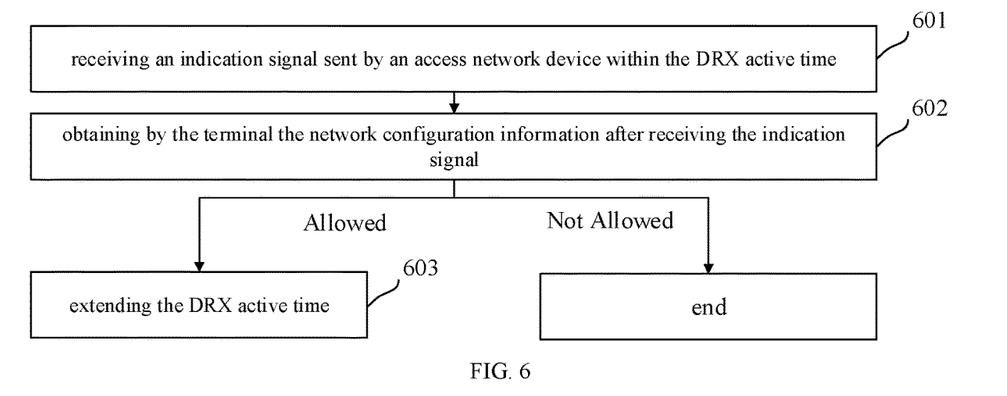
FIG. 6 is a flowchart illustrating a method for controlling an active time according to an embodiment.

FIG. 6 is a flowchart illustrating a method for controlling an active time according to an embodiment of the disclosure. In the method shown in FIG. 6, the IDC related information includes network configuration information. The network configuration information is generated by an access network device based on information on whether a terminal has an IDC problem. The network configuration information is configured to indicate whether extending a DRX active time is allowed. That is, the DRX active time is extended based on the network configuration information. The method can be executed by the terminal. As illustrated in FIG. 6, the method includes the following.

At block 601, an indication signal sent by the access network device is received within the DRX active time.

Regarding to description of the step at block 601, reference can be made to the step at block 401, which is not elaborated here.

At block 602, the terminal obtains the network configuration information after receiving the indication signal.

When the network configuration information indicates that extending the DRX active time is allowed, the step at block 603 is executed. When the network configuration information indicates that extending the DRX active time is not allowed, the current procedure ends.

The network configuration information may be sent by the access network device to the terminal and stored locally by the terminal. The step at block 602 may include reading the network configuration information from a specified storage position after receiving the indication signal. For example, the network configuration information may be an identifier. When the identifier is a first value, it indicates that extending the DRX active time is allowed. When the identifier is a second value, it indicates that extending the DRX active time is not allowed. For example, when the identifier is "1", it indicates that extending the DRX active time is allowed. When the identifier is "0", it indicates that extending the DRX active time is not allowed.

At block 603, the DRX active time is extended.

In block 603, the DRX active time can be extended in the way described in block 403.

Alternatively, the network configuration information may be further configured to indicate an extended duration of the DRX active time. In this case, in block 603, in addition to extending the DRX active time in the way described in block 403, the DRX active time may be extended in the following ways.

The DRX active time is extended based on the extended duration, such that a duration of the extended DRX active time is equal to a sum of a remaining duration of the DRX active time and the extended duration.

For example, when the network configuration information is further configured to indicate the extended duration of the DRX active time, the network configuration information sent by the access network device to the terminal may include a duration of a timer. When the duration of the timer is not 0, it indicates that extending the DRX active time is allowed, and the duration of the timer is the extended duration. When the duration of the timer is 0, it indicates that extending the DRX active time is not allowed. Or, when the network configuration information does not include the duration of the timer, it indicates that extending the DRX active time is not allowed.

Alternatively, the method may further include receiving the network configuration information sent by the access network device.

For example, the access network device may send the network configuration information through a radio resource control (RRC) message. Correspondingly, the terminal obtains the network configuration information from the received RRC message.

Alternatively, before receiving the network configuration information sent by the access network device, the method may further include sending IDC indication information to the access network device, in which the IDC indication information is configured to indicate whether the terminal has the IDC problem. Correspondingly, the network configuration information may be sent by the access network device based on the received IDC indication information.

For example, if the IDC indication information indicates that the terminal has no IDC problem, the access network device sends the network configuration information indicating that extending the DRX active time is allowed to the terminal. If the IDC indication information indicates that the terminal has the IDC problem, the access network device sends the network configuration information indicating that extending the DRX active time is not allowed to the terminal.

Determining whether to extend the DRX active time based on the IDC related information can be implemented through steps at blocks 602-603.

In the embodiment, since the network configuration information is generated by the access network device based on information whether the terminal has the IDC problem, the terminal determining whether to extend the DRX active time based on the network configuration information is equivalent to determining whether to extend the DRX active time based on the information whether the terminal has the IDC problem. For the terminal not having the IDC problem, extending the DRX active time may enable the access network device to have more sufficient time to schedule the terminal. Since the terminal has no IDC problem, the terminal does not solve the IDC problem based on DRX, extending the DRX active time has no effect on the communication based on the non-NR technology. For the terminal having the IDC problem, the DRX active time is not extended. In this way, in the terminal having the IDC problem, the DRX off time of the terminal solving the IDC problem based on DRX is not occupied, such that normal communication of the communication module based on the non-NR technology in the terminal is ensured.

Figure 7:
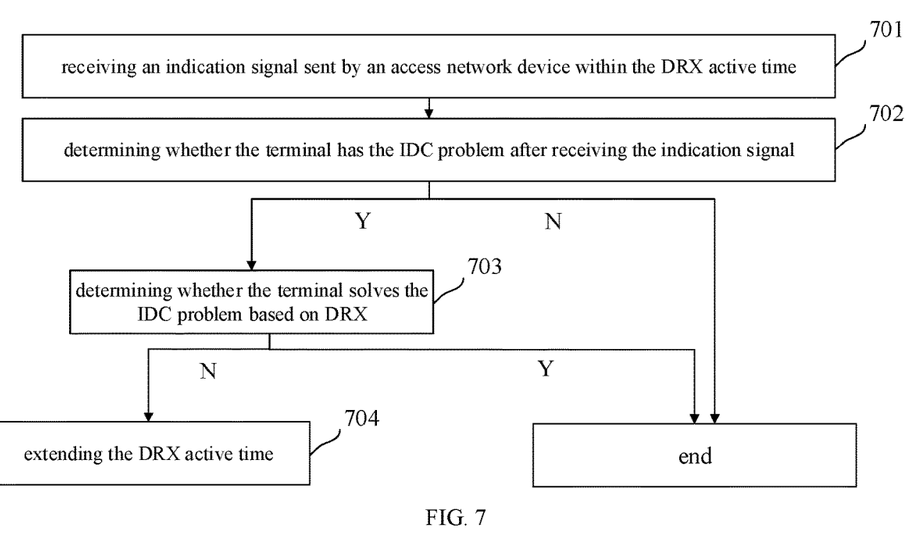
FIG. 7 is a flowchart illustrating a method for controlling an active time according to an embodiment.

FIG. 7 is a flowchart illustrating a method for controlling an active time according to an embodiment of the disclosure. In the method shown in FIG. 7, the IDC related information includes information whether a terminal has an IDC problem and information on whether the terminal solves the IDC problem based on DRX. That is, the DRX active time is extended based on the information whether the terminal has the IDC problem and the information on whether the terminal solves the IDC problem based on DRX. The method can be executed by the terminal. As illustrated in FIG. 7, the method includes the following.

At block 701, an indication signal sent by an access network device is received within the DRX active time.

Regarding description of the step at block 701, reference can be made to the step at block 401, which is not elaborated here.

At block 702, after the indication signal is received, it is determined whether the terminal has the IDC problem.

If the terminal has the IDC problem, the step at block 703 is executed. If the terminal does not have the IDC problem, the step at block 704 is executed.

At block 703, it is determined whether the terminal solves the IDC problem based on DRX.

If the terminal does not solve the IDC problem based on DRX, the step at block 704 is executed. If the terminal solves the IDC problem based on DRX, the current procedure ends. That is, if the terminal solves the IDC problem based on DRX, the DRX active time is not extended, and the terminal enters the DRX off time after the DRX active time expires, and does not monitor the PDCCH.

Regarding description of the step at block 703, reference can be made to the step at block 502, which is not elaborated here.

At block 704, the DRX active time is extended.

Regarding description of the step at block 704, reference can be made to the step at block 403, which is not elaborated here.

It should be noted that, in the embodiment, whether the terminal has the IDC problem is firstly determined, and then whether the terminal solves the IDC problem based on DRX is determined. In other embodiments, whether the terminal solves the IDC problem based on DRX can be determined firstly, and then whether the terminal has the IDC problem can be determined.

Determining whether to extend the DRX active time based on the IDC related information can be implemented through steps at blocks 702-704.

In the embodiment, for the terminal not having the IDC problem and the terminal having the IDC problem but not solving the IDC problem based on DRX, extending the DRX active time may enable the access network device to have more sufficient time to schedule the terminal, and have no effect on the communication based on the non-NR technology. For the terminal having the IDC problem and solving the IDC problem based on DRX, the DRX active time is not extended. In this way, in the terminal having the IDC problem and solving the IDC problem based on DRX, the DRX off time is not occupied, such that normal communication of the communication module based on the non-NR technology in the terminal is ensured.

Figure 8:
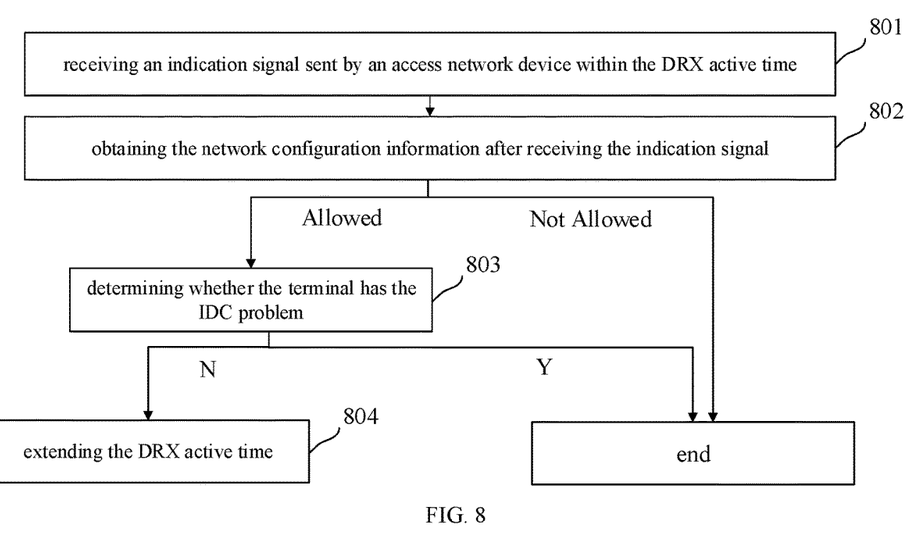
FIG. 8 is a flowchart illustrating a method for controlling an active time according to an embodiment.

FIG. 8 is a flowchart illustrating a method for controlling an active time according to an embodiment of the disclosure. In the method shown in FIG. 8, the IDC related information includes information on whether a terminal has an IDC problem and network configuration information. That is, the DRX active time is extended based on the information on whether the terminal has the IDC problem and the network configuration information. The method can be executed by the terminal. As illustrated in FIG. 8, the method includes the following.

At block 801, an indication signal sent by the access network device is received within the DRX active time.

Regarding description of the step at block 801, reference can be made to the step at block 401, which is not elaborated here.

At block 802, the network configuration information is obtained after receiving the indication signal.

When the network configuration information indicates that extending the DRX active time is allowed, the step at block 803 is executed. When the network configuration information indicates that extending the DRX active time is not allowed, the current procedure ends, that is, the DRX active time is not extended, the terminal enters the DRX off time when the DRX active time expires and does not monitor the PDCCH.

At block 803, it is determined whether the terminal has the IDC problem.

If the terminal has no IDC problem, the step at block 804 is executed. If the terminal has the IDC problem, the current procedure ends, that is, the DRX active time is not extended, the terminal enters the DRX off time when the DRX active time expires and does not monitor the PDCCH.

Regarding description of the step at block 803, reference can be made to the step at block 402, which is not elaborated here.

At block 804, the DRX active time is extended.

Regarding description of the step at block 804, reference can be made to the step at block 603, which is not elaborated here.

Determining whether to extend the DRX active time based on the IDC related information can be implemented through steps at blocks 802-804.

In the embodiment, for the terminal not having the IDC problem, extending the DRX active time may enable the access network device to have more sufficient time to schedule the terminal. Since the terminal has no IDC problem, the terminal does not solve the IDC problem based on DRX, extending the DRX active time has no effect on the communication based on the non-NR technology. For the terminal having the IDC problem, the DRX active time is not extended. In this way, in the terminal having the IDC problem, the DRX off time of the terminal solving the IDC problem based on DRX is not occupied, such that normal communication of the communication module based on the non-NR technology in the terminal is ensured.

Additionally, since the network configuration information can be configured to indicate whether the terminal can extend the DRX active time, the method may be applied in more scenarios and has more flexible configuration.

Figure 9:
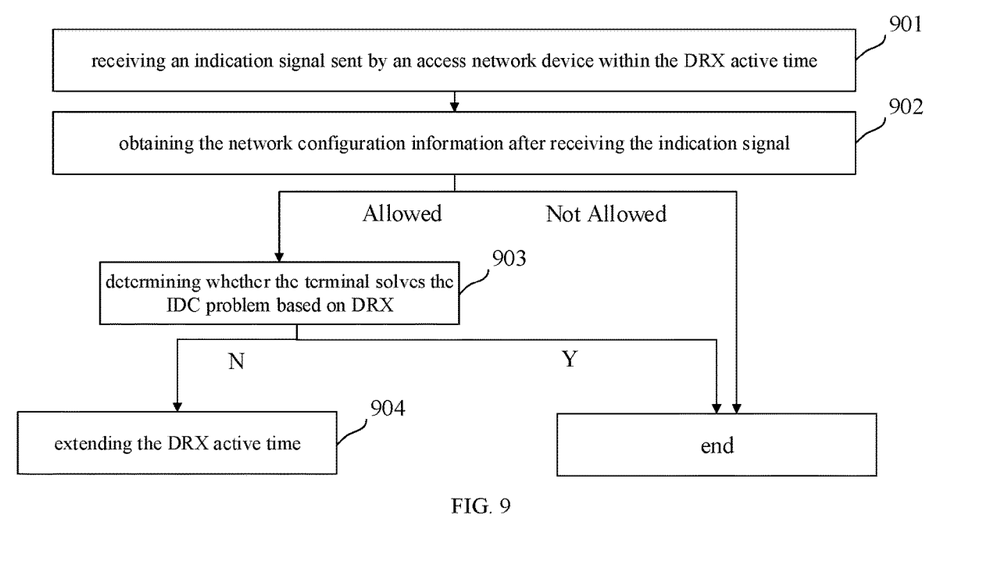
FIG. 9 is a flowchart illustrating a method for controlling an active time according to an embodiment.

FIG. 9 is a flowchart illustrating a method for controlling an active time according to an embodiment of the disclosure. In the method shown in FIG. 9, the IDC related information includes information on whether a terminal solves an IDC problem based on DRX and network configuration information. That is, the DRX active time is extended based on the information on whether the terminal solves the IDC problem based on DRX and the network configuration information. The method can be executed by the terminal. As illustrated in FIG. 9, the method includes the following.

At block 901, an indication signal sent by the access network device is received within the DRX active time.

Regarding description of the step at block 901, reference can be made to the step at block 401, which is not elaborated here.

At block 902, the network configuration information is obtained after receiving the indication signal.

When the network configuration information indicates that extending the DRX active time is allowed, the step at block 903 is executed. When the network configuration information indicates that extending the DRX active time is not allowed, the current procedure ends, that is, the DRX active time is not extended, the terminal enters the DRX off time when the DRX active time expires and does not monitor the PDCCH.

At block 903, it is determined whether the terminal solves the IDC problem based on DRX.

If the terminal does not solve the IDC problem based on DRX, the step at block 904 is executed. If the terminal solves the IDC problem based on DRX, the current procedure ends, that is, the DRX active time is not extended, the terminal enters the DRX off time when the DRX active time expires and does not monitor the PDCCH.

Regarding description of the step at block 903, reference can be made to the step at block 402, which is not elaborated here.

At block 904, the DRX active time is extended.

Regarding description of the step at block 904, reference can be made to the step at block 603, which is not elaborated here.

Determining whether to extend the DRX active time based on the IDC related information can be implemented through steps at blocks 902-904.

In the embodiment, for the terminal not solving the IDC problem based on DRX, extending the DRX active time may enable the access network device to have more sufficient time to schedule the terminal. For the terminal not solving the IDC problem based on DRX, shortening the DRX off time has no effect on the communication of the communication module based on the non-NR technology. For the terminal solving the IDC problem based on DRX, the DRX active time is not extended. In this way, in the terminal solving the IDC problem based on DRX, the DRX off time is not occupied, such that normal communication of the communication module based on the non-NR technology in the terminal is ensured.

Additionally, since the network configuration information can be configured to indicate whether the terminal can extend the DRX active time, the method may be applied in more scenarios and has more flexible configuration.

Figure 10:
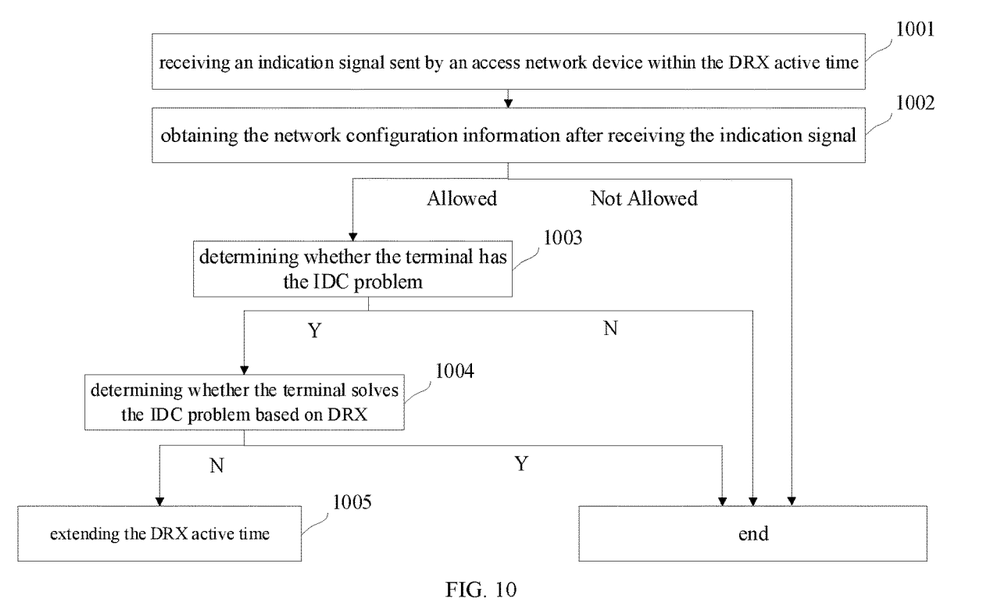
FIG. 10 is a flowchart illustrating a method for controlling an active time according to an embodiment.

FIG. 10 is a flowchart illustrating a method for controlling an active time according to an embodiment of the disclosure. In the method shown in FIG. 10, the IDC related information includes information whether a terminal has an IDC problem, information on whether the terminal solves the IDC problem based on DRX and network configuration information. That is, the DRX active time is extended based on the information whether the terminal has the IDC problem, the information on whether the terminal solves the IDC problem based on DRX and the network configuration information. The method can be executed by the terminal. As illustrated in FIG. 10, the method includes the following.

At block 1001, an indication signal sent by the access network device is received within the DRX active time.

Regarding description of the step at block 1001, reference can be made to the step at block 401, which is not elaborated here.

At block 1002, the network configuration information is obtained after receiving the indication signal. When the network configuration information indicates that extending the DRX active time is allowed, the step at block 1003 is executed. When the network configuration information indicates that extending the DRX active time is not allowed, the current procedure ends, that is, the DRX active time is not extended, the terminal enters the DRX off time when the DRX active time expires and does not monitor the PDCCH.

At block 1003, it is determined whether the terminal has the IDC problem.

If the terminal has the IDC problem, the step at block 1004 is executed. If the terminal does not have the IDC problem, the step at block 1005 is executed.

Regarding description of the step at block 1003, reference can be made to the step at block 402, which is not elaborated here.

At block 1004, it is determined whether the terminal solves the IDC problem based on DRX.

If the terminal does not solve the IDC problem based on DRX, the step at block 1005 is executed. If the terminal solves the IDC problem based on DRX, the current procedure ends, that is, the DRX active time is not extended, the terminal enters the DRX off time when the DRX active time expires and does not monitor the PDCCH.

At block 1005, the DRX active time is extended.

Regarding description of the step at block 1005, reference can be made to the step at block 603, which is not elaborated here.

It should be noted that, in the embodiment, whether the terminal has the IDC problem is firstly determined, and then whether the terminal solves the IDC problem based on DRX is determined. In other embodiments, whether the terminal solves the IDC problem based on DRX can be determined firstly, and then whether the terminal has the IDC problem can be determined.

Determining whether to extend the DRX active time based on the IDC related information can be implemented through steps at blocks 1002-1005.

In one embodiment, for the terminal not having the IDC problem and the terminal having the IDC problem but not solving the IDC problem based on DRX, extending the DRX active time may enable the access network device to have more sufficient time to schedule the terminal, and have no effect on the communication based on the non-NR technology. For the terminal having the IDC problem and solving the IDC problem based on DRX, the DRX active time is not extended. In this way, in the terminal having the IDC problem and solving the IDC problem based on DRX, the DRX off time is not occupied, such that normal communication of the communication module based on the non-NR technology in the terminal is ensured.

Additionally, since the network configuration information can be configured to indicate whether the terminal can extend the DRX active time, the method may be applied in more scenarios and has more flexible configuration.

Figure 11:
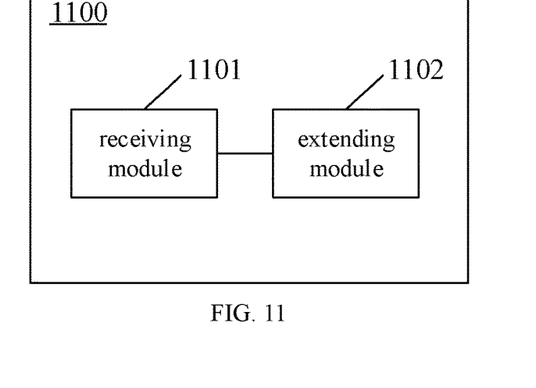
FIG. 11 is a block diagram illustrating an apparatus for controlling an active time according to an embodiment.

FIG. 11 is a block diagram illustrating an apparatus for controlling an active time according to an embodiment. The apparatus has a function to implement the terminal described in the above method embodiments, and the function can be implemented by hardware or by executing corresponding software with hardware. As illustrated in FIG. 11, the apparatus 1100 includes a receiving module 1101 and an extending module 1102.

The receiving module 1101 is configured to receive an indication signal sent by an access network device within a discontinuous reception (DRX) active time. The extending module 1102 is configured to determine, based on in-device coexistence (IDC) related information of the terminal, whether to extend the DRX active time after receiving the indication signal.

Alternatively, the IDC related information includes at least one of information on whether the terminal has an IDC problem, information on whether the terminal solves the IDC problem based on DRX, and network configuration information; in which the network configuration information is configured to indicate whether extending the DRX active time is allowed, and the network configuration information is generated by the access network device based on the information on whether the terminal has the IDC problem.

Alternatively, the extending module 1102 is configured to extend the DRX active time in response to the terminal having no IDC problem.

Alternatively, the extending module 1102 is configured to extend the DRX active time in response to the terminal having the IDC problem and the terminal not solving the IDC problem based on the DRX.

Alternatively, the extending module 1102 is configured to extend the DRX active time in response to the network configuration information indicating that extending the DRX active time is allowed.

Alternatively, the extending module 1102 is configured to restart a running DRX timer or delay an expiring time of the running DRX timer, in which the running DRX timer is any one of an on duration timer, an inactivity timer, a DRX retransmission timer and a random access contention resolution timer.

Alternatively, the extending module 1102 is configured to: monitor a physical downlink control channel (PDCCH) within a predetermined duration after receiving the indication signal; or start another timer when receiving the indication signal, in which the another timer is a timer other than a running DRX timer, and when both the another timer and the running DRX timer expire, the DRX active timer ends.

The predetermined duration and a duration of the another timer is greater than a remaining duration of the running DRX timer.

Alternatively, the network configuration information is further configured to indicate an extended duration of the DRX active time; the extending module 1102 is configured to extend the DRX active time based on the extended duration.

Figure 12:
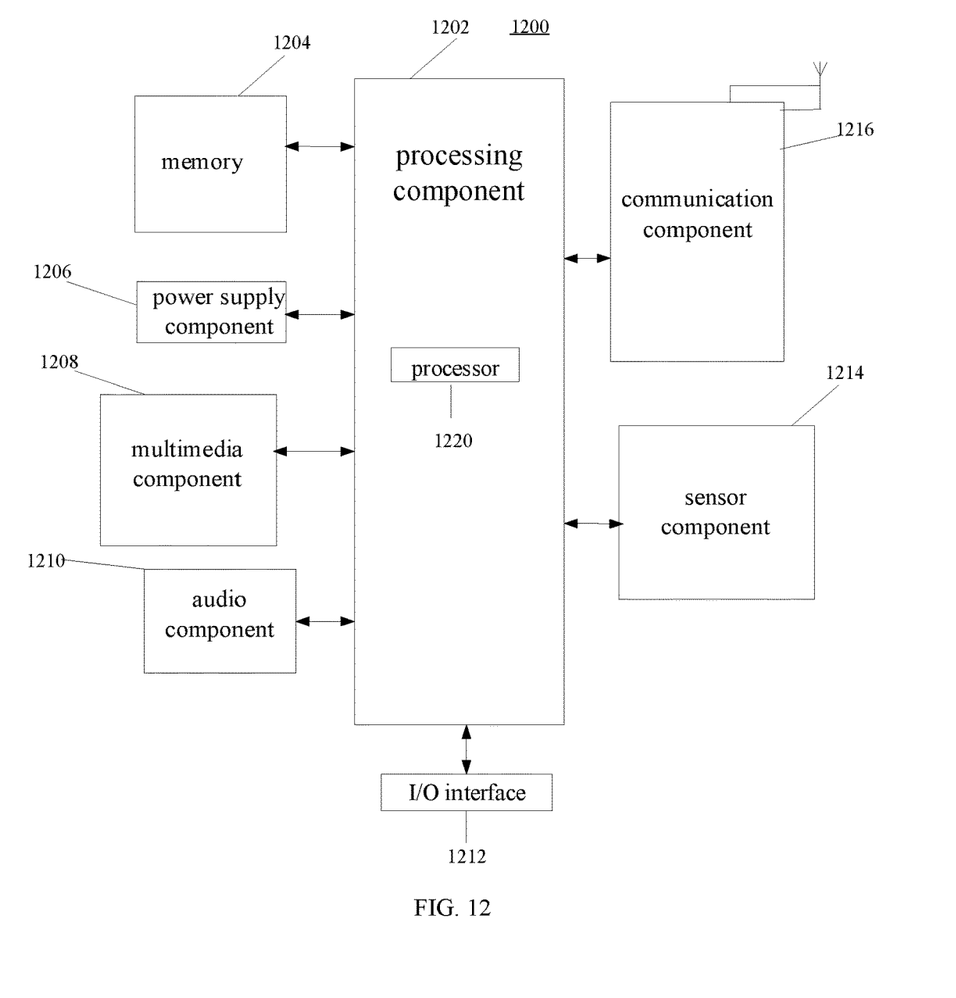
FIG. 12 is a block diagram illustrating an apparatus for controlling an active time according to an embodiment.

FIG. 12 is a block diagram illustrating an apparatus 1200 for controlling an active time according to an embodiment. The apparatus 1200 can be the terminal described above. Referring to FIG. 12, the apparatus 1200 may include one or more components of the followings: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the whole operation of the apparatus 1200, such as the operations related to display, phone call, data communication, camera operation and recording operation. The processing component 1202 may include one or more processors 1220 to perform instructions, to complete all or part of blocks of the above method. In addition, the processing component 1202 may include one or more modules for the convenience of interaction between the processing component 1202 and other components. For example, the processing component 1202 may include a multimedia module for the convenience of interaction between the multimedia component 1208 and the processing component 1202.

The memory 1204 is configured to store all types of data to support the operation of the apparatus 1200. Examples of the data include the instructions of any applications or methods operated on the apparatus 1200, contact data, phone book data, messages, pictures, videos, etc. The memory 1204 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1206 may provide power for all components of the apparatus 1200. The power supply component 1206 may include a power supply management system, one or more power supplies, and other units related to generating, managing and distributing power for the apparatus 1200.

The multimedia component 1208 includes an output interface screen provided between the apparatus 1200 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 1208 includes a front camera and/or a rear camera. When the apparatus 1200 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 1210 is configured to output and/or input an audio signal. For example, the audio component 1210 includes a microphone (MIC). When the apparatus 1200 is in an operation mode, such as a call mode, a record mode, and a speech recognition mode, the microphone is configured to receive the external audio signal. The received audio signal may be further stored in the memory 1204 or sent via the communication component 1216. In some embodiments, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The button may include but not limited to a home button, a volume button, a start button and a lock button.

The sensor component 1214 includes one or more sensors, configured to provide various aspects of status assessment for the apparatus 1200. For example, the sensor component 1214 may detect the on/off state of the apparatus 1200 and the relative positioning of the component. For example, the component is a display and a keypad of the apparatus 1200. The sensor component 1214 may further detect the location change of the apparatus 1200 or one component of the apparatus 1200, the presence or absence of contact between the user and the apparatus 1200, the orientation or acceleration/deceleration of the apparatus 1200, and the temperature change of the apparatus 1200. The sensor component 1214 may include a proximity sensor configured to detect the existence of the objects nearby without any physical contact. The sensor component 1214 may further include a light sensor such as CMOS or CCD image sensor, which is configured to use in imaging applications. In some embodiments, the sensor component 1214 may further include an acceleration transducer, a gyroscope sensor, a magnetic sensor, a pressure sensor or a temperature sensor.

The communication component 1216 is configured for the convenience of wire or wireless communication between the apparatus 1200 and other devices. The communication component 1216 may access wireless networks based on communication standard, such as WI-FI, 2G, 3G, 4G or 5G, or their combination, so as to realize random access. In an embodiment, the communication component 1216 receives broadcast signals or broadcast-related information from an external broadcast management system via a broadcast channel. In an embodiment, the communication component 1216 further includes a near field communication (NFC) module to facilitate short-range communication. For example, the NFC module may be achieved based on an RFID technology, an IrDA technology, a UWB technology, a BT technology and other technologies.

In an embodiment, the apparatus 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 1204 including instructions, the instructions may be executed by the processor 1220 of the apparatus 1200 to complete the above methods. For example, the non-transitory computer-readable storage medium may be a ROM, a random access memory (RAM), a CD-ROM, a magnetic tape, a floppy disk, an optical data storage device, etc.

Figure 13:
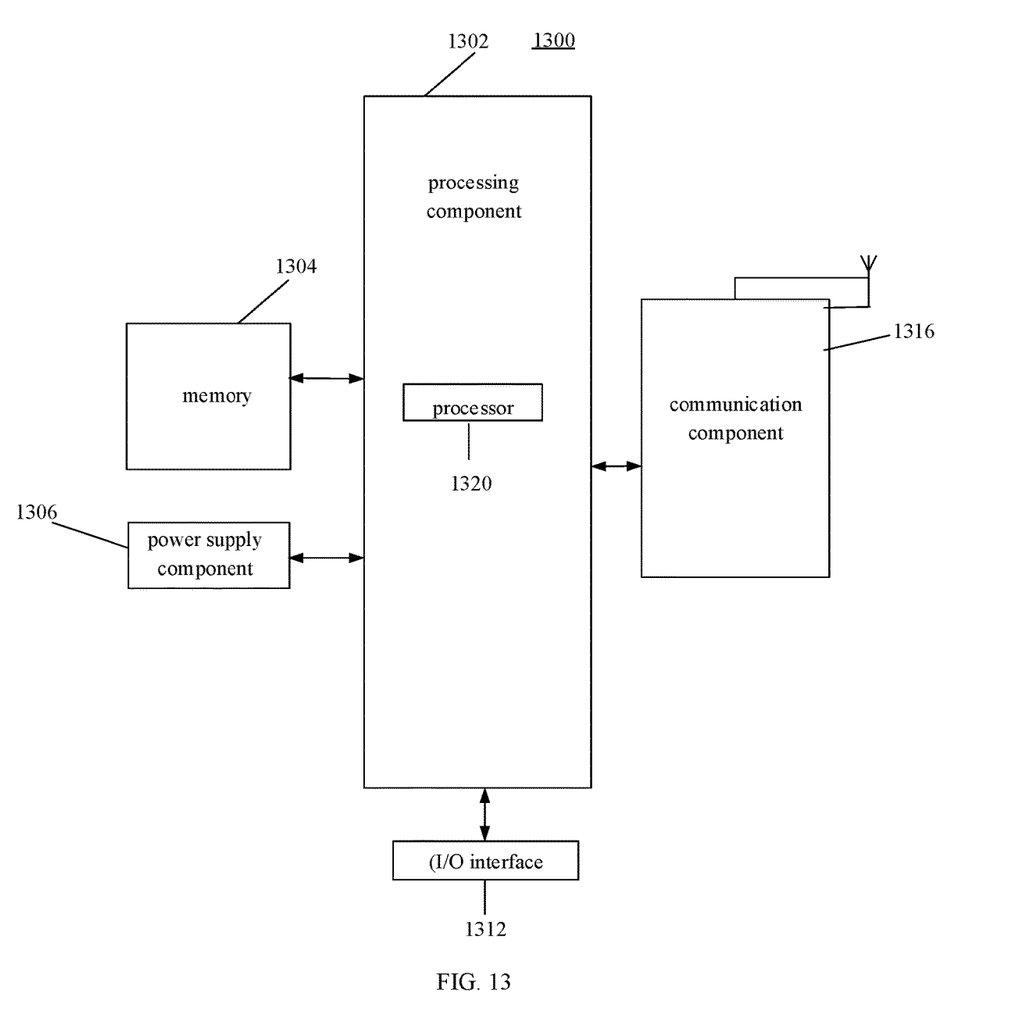
FIG. 13 is a block diagram illustrating an access network device according to an embodiment.

FIG. 13 is a block diagram illustrating an access network device 1300 according to an embodiment. Referring to FIG. 13, the apparatus 1300 may include one or more components of the followings: a processing component 1302, a memory 1304, a power supply component 1306, an input/output (I/O) interface 1312, and a communication component 1316.

The processing component 1302 generally controls the whole operation of the access network device 1300. The processing component 1302 may include one or more processors 1320 to perform instructions, to complete all or part of blocks of the above method. In addition, the processing component 1302 may include one or more modules for the convenience of interaction between the processing component 1302 and other components.

The memory 1304 is configured to store all types of data to support the operation of the access network device 1300. Examples of the data include the instructions of any applications or methods operated on the access network device 1300. The memory 1304 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1306 may provide power for all components of the access network device 1300. The power supply component 1306 may include a power supply management system, one or more power supplies, and other units related to generating, managing and distributing power for the access network device 1300.

The I/O interface 1312 provides an interface for the processing component 1302 and the peripheral interface module, and the peripheral interface module may be a keyboard, a click wheel, a button, etc. The button may include but not limited to a home button, a volume button, a start button and a lock button.

The communication component 1316 is configured for the convenience of wire or wireless communication between the access network device and other devices. The communication component 1316 may provide a wireless network based on communication standard, such as WI-FI, 2G, 3G, 4G or 5G, or their combination, so as to connect a terminal.

In an embodiment, the access network device 1300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components.

Embodiments of the present disclosure further provide a random access system. The random access system includes an access network device and a terminal. The terminal may be the apparatus for controlling an active time provided in the embodiment as described with reference to FIG. 12. As illustrated in FIG. 13, the access network device may be configured to send the indication signal, and the signal carrying the network configuration information described above.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for controlling an active time, comprising:
    receiving, by a terminal, an indication signal sent by an access network device within a discontinuous reception (DRX) active time; and
    determining, based on in-device coexistence (IDC) related information of the terminal, whether to extend the DRX active time after receiving the indication signal, wherein, the IDC related information comprises network configuration information; wherein the network configuration information is configured to indicate whether extending the DRX active time is allowed, and the network configuration information is generated by the access network device based on the information on whether the terminal has the IDC problem.

2. The method of claim 1, wherein, the IDC related information further comprises at least one of information on whether the terminal has an IDC problem, information on whether the terminal solves the IDC problem based on DRX.

3. The method of claim 2, wherein, determining based on the IDC related information of the terminal whether to extend the DRX active time comprises:
    extending the DRX active time in response to the terminal having no IDC problem.

4. The method of claim 2, wherein, determining based on the IDC related information of the terminal whether to extend the DRX active time comprises:
    extending the DRX active time in response to the terminal having the IDC problem and the terminal not solving the IDC problem based on the DRX.

5. The method of claim 2, wherein, determining based on the IDC related information of the terminal whether to extend the DRX active time comprises:
    extending the DRX active time in response to the network configuration information indicating that extending the DRX active time is allowed.

6. The method of claim 2, wherein the network configuration information is further configured to indicate an extended duration of the DRX active time;
    wherein extending the DRX active time comprises:
    extending the DRX active time based on the extended duration.

7. The method of claim 1, wherein, extending the DRX active time comprises:
    restarting a running DRX timer or delaying an expiring time of the running DRX timer, wherein the running DRX timer is any one of an on duration timer, an inactivity timer, a DRX retransmission timer and a random access contention resolution timer.

8. The method of claim 1, wherein, extending the DRX active time comprises:
    monitoring a physical downlink control channel (PDCCH) within a predetermined duration after receiving the indication signal;
    wherein the predetermined duration is greater than a remaining duration of the running DRX timer.

9. The method of claim 1, wherein, extending the DRX active time comprises:
    starting another timer when receiving the indication signal, wherein the another timer is a timer other than a running DRX timer, and when both the another timer and the running DRX timer expire, the DRX active timer ends;
    wherein a duration of the another timer is greater than a remaining duration of the running DRX timer.

10. An apparatus for controlling an active time, comprising:
    a processor; and
    a memory configured to store instructions executable by the processor;
    wherein, the processor is configured to load and execute the instructions to implement the method for controlling an active time, comprising:
    receiving by a terminal an indication signal sent by an access network device within a discontinuous reception (DRX) active time; and
    determining, based on in-device coexistence (IDC) related information of the terminal, whether to extend the DRX active time after receiving the indication signal, wherein, the IDC related information comprises network configuration information; wherein the network configuration information is configured to indicate whether extending the DRX active time is allowed, and the network configuration information is generated by the access network device based on the information on whether the terminal has the IDC problem.

11. The apparatus of claim 10, wherein, the IDC related information further comprises at least one of information on whether the terminal has an IDC problem, information on whether the terminal solves the IDC problem based on DRX.

12. The apparatus of claim 11, wherein, determining based on the IDC related information of the terminal whether to extend the DRX active time comprises:
    extending the DRX active time in response to the terminal having no IDC problem.

13. The apparatus of claim 11, wherein, determining based on the IDC related information of the terminal whether to extend the DRX active time comprises:
    extending the DRX active time in response to the terminal having the IDC problem and the terminal not solving the IDC problem based on the DRX.

14. The apparatus of claim 11, wherein, determining based on the IDC related information of the terminal whether to extend the DRX active time comprises:
    extending the DRX active time in response to the network configuration information indicating that extending the DRX active time is allowed.

15. The apparatus of claim 11, wherein the network configuration information is further configured to indicate an extended duration of the DRX active time;
    wherein extending the DRX active time comprises:
    extending the DRX active time based on the extended duration.

16. The apparatus of claim 10, wherein, extending the DRX active time comprises:
  restarting a running DRX timer or delaying an expiring time of the running DRX timer, wherein the running DRX timer is any one of an on duration timer, an inactivity timer, a DRX retransmission timer and a random access contention resolution timer.

17. The apparatus of claim 10, wherein, extending the DRX active time comprises:
  monitoring a physical downlink control channel (PDCCH) within a predetermined duration after receiving the indication signal;
  wherein the predetermined duration is greater than a remaining duration of the running DRX timer.

18. The apparatus of claim 10, wherein, extending the DRX active time comprises:
  starting another timer when receiving the indication signal, wherein the another timer is a timer other than a running DRX timer, and when both the another timer and the running DRX timer expire, the DRX active timer ends;
  wherein a duration of the another timer is greater than a remaining duration of the running DRX timer.

19. A non-transitory computer-readable storage medium, wherein when instructions stored in the computer-readable storage medium are executed by a processor, the method for controlling an active time, comprising:
  receiving by a terminal an indication signal sent by an access network device within a discontinuous reception (DRX) active time; and
  determining, based on in-device coexistence (IDC) related information of the terminal, whether to extend the DRX active time after receiving the indication signal, wherein, the IDC related information comprises network configuration information; wherein the network configuration information is configured to indicate whether extending the DRX active time is allowed, and the network configuration information is generated by the access network device based on the information on whether the terminal has the IDC problem.

20. The non-transitory computer-readable storage medium of claim 19, wherein, the IDC related information further comprises at least one of information on whether the terminal has an IDC problem, information on whether the terminal solves the IDC problem based on DRX.

* * * * *